United States Patent

[11] 3,607,964

| [72] | Inventors | Kenji Naito;<br>Yoshio Kamatani, both of Osaka, Japan |
|---|---|---|
| [21] | Appl. No. | 4,959 |
| [22] | Filed | Jan. 22, 1970 |
| [45] | Patented | Sept. 21, 1971 |
| [73] | Assignee | Takeda Chemical Industries, Ltd.<br>Osaka, Japan |
| [32] | Priority | Jan. 23, 1969 |
| [33] | | Japan |
| [31] | | 4886/69 |

[54] METHOD FOR PRODUCING ISOPRENE AND APPARATUS THEREFOR
4 Claims, 1 Drawing Fig.

[52] U.S. Cl.................................................. 260/681, 208/146
[51] Int. Cl..............................................C07c 11/18, C07c 1/20
[50] Field of Search.......................... 260/681; 208/65, 146

[56] References Cited
UNITED STATES PATENTS

| 2,938,859 | 5/1960 | Hertwig et al. | 208/140 |
| 2,943,999 | 7/1960 | Moore et al. | 208/65 |
| 2,965,560 | 12/1960 | Smith | 208/65 |
| 3,130,145 | 4/1964 | Buckhannan | 208/65 |
| 3,142,545 | 7/1964 | Raarup et al. | 208/65 X |
| 3,154,481 | 10/1964 | Brooks | 208/65 |
| 3,146,278 | 8/1964 | Habeshaw et al. | 260/681 |
| 3,253,051 | 5/1966 | Yanagita et al. | 260/681 |
| 2,578,704 | 12/1951 | Houdry | 208/146 X |

*Primary Examiner*—Delbert E. Gantz
*Assistant Examiner*—G. E. Schmitkons
*Attorney*—Wenderoth, Lind & Ponack ABSTRACT: An improved method for the production of isoprene from the fixed vapor phase condensation of formaldehyde and isobutene which comprises housing a portion of the catalyst in each of a series of reaction chambers, the oldest being the terminal chamber. The said terminal chamber is replaced by adding a chamber housing fresh catalyst at the opposite end.

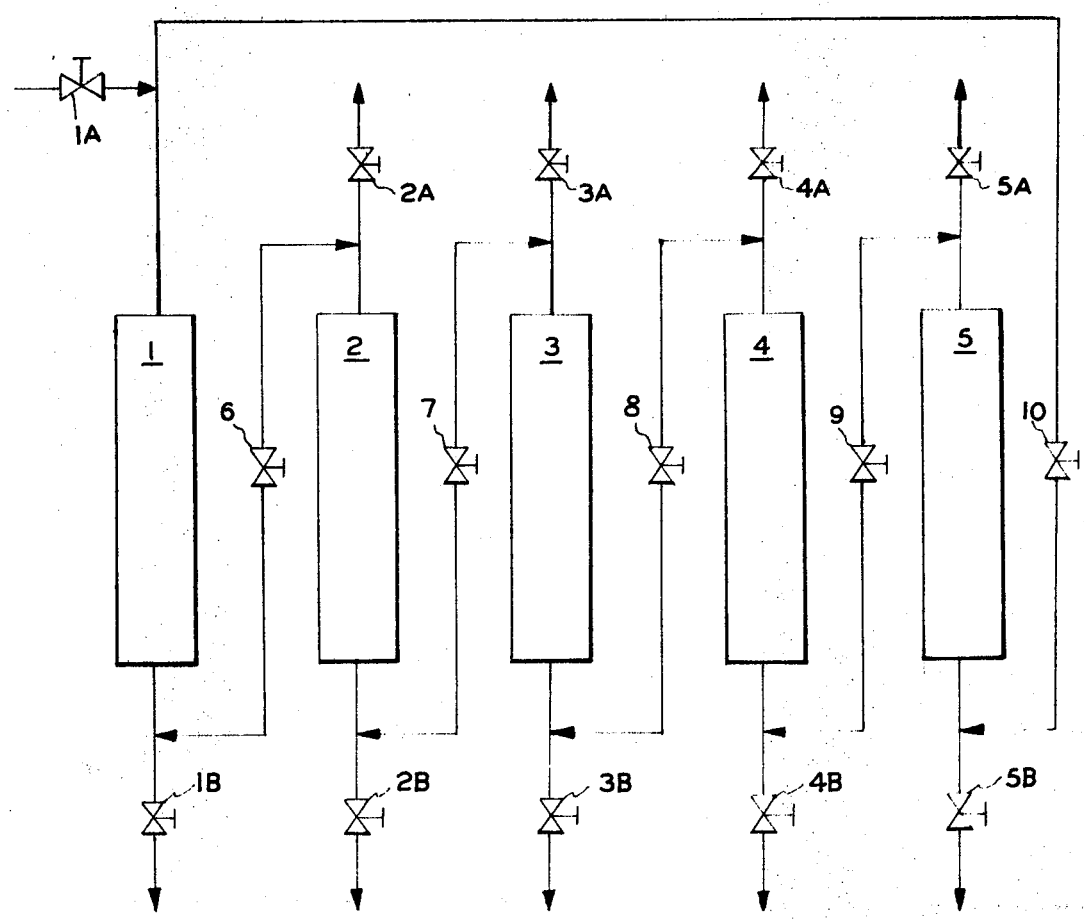
INVENTORS
KENJI NAITO
YOSHIO KAMATANI

METHOD FOR PRODUCING ISOPRENE AND APPARATUS THEREFOR

The present invention relates to a method for producing isoprene and an apparatus therefor.

The recent years have witnessed an increased demand for isoprene from synthetic rubber manufacturers and consequent desire to produce isoprene of high purity economically. For such purpose, there was proposed a method in which formaldehyde is condensed with isobutene in gas phase at an elevated temperature in the presence of a catalyst.

However, the catalysts for the condensation reaction generally have relatively short catalytic life, resulting soon in the drop of the reaction rate (conversion) and in the reduction of efficiency in isoprene production.

For avoiding this, the catalyst is frequently submitted to regeneration operation during which time the reaction has to be suspended. However, the regeneration of the catalyst should not be conducted too often because of the peculiar fact that, in the initial reaction stage where a fresh catalyst is used, there take place considerable side reactions (such as decomposition and polymerization of the raw materials as well as of the produced isoprene), leading to decreased selectivity for isoprene formation and to depression of the purity of the product.

Thus, so far as use is made of a conventional reactor housing a fixed catalyst bed, the condensation has been compelled to be carried out at the sacrifice of either the selectivity for isoprene or the catalytic efficiency.

In the course of the present inventors' repeated experiments, they noticed that said defects in the hitherto-known method can be lessened by the employment of so-called "-moving bed" catalyst that is, the catalyst per se is moved on a conveyor set in the reactor. However, their further study, in this respect has revealed that the moving-bed technic is satisfactory for a small scale experiment in laboratory from the viewpoints of yield and purity of the product isoprene, but, in a large scale production, it requires something like unsurmountable procedural complexity and increased cost, particularly these catalysts have a serious drawback in being worn out by moving to be pulverized powders in a short period of reaction time.

The present inventors have now found unexpectedly that isoprene is produced without any of said shortcomings and disadvantages by condensation between formaldehyde and isobutene in a gas phase in an apparatus comprising a series of reaction chambers, each housing a portion of a catalyst which has taken part in the condensation reaction for different period of time from one another, and each chamber being linked in the sequence corresponding to the reaction time gradient.

It has also been found by the present inventors that when the reaction is carried out in said apparatus, the reaction rate of formaldehyde is maintained at a high level without changes with time and the selectivity for isoprene can also be held at high rate to give an improved overall selectivity which is higher than the level obtainable by the conventional fixed-bed reaction, consequently that the method of the present invention enhances the purity as well as the yield of the product isoprene and depress the amount of by products.

It is therefore the principal object of the present invention to provide a novel and industrially feasible method for producing isoprene through condensation between formaldehyde and isobutene in the presence of the fixed-bed catalyst with good yield in a pure state with low cost.

Said object is realized by conducting formaldehyde and isobutene into a terminal reaction chamber of an apparatus comprising a series of reaction chambers, each housing a portion of a catalyst which has taken part in the reaction for different period of time from one another, and each linked in the sequence corresponding to the reaction time gradient, while recovering the so produced isoprene from the gas flowing out of the other terminal reaction chamber in said series, and, at times, withdrawing a terminal reaction chamber housing older catalyst from said series of reaction chambers, while connecting a reaction chamber housing a fresh fixed-bed catalyst to the other terminal reaction chamber in said series.

In order to carry out the method of the present invention satisfactorily, the apparatus comprising a series of reaction chambers is subjected to pretreatments, for example as follows:

A plurality of reaction chambers housing a fixed-bed catalyst are connected in a series with gas-conductible ducts. The starting materials, formaldehyde and isobutene, are allowed to pass through the catalyst bed in each reaction chamber. From one terminal reaction chamber to the other terminal at an elevated temperature from about 200° C. to about 350° C. to allow the reaction to take place. The gas flowing out of the other terminal reaction chamber contains isoprene. After some time of reaction, one terminal reaction chamber, either the inlet side or the outlet side, is disconnected, and a reaction chamber equipped with a newly prepared or regenerated catalyst is connected to the other terminal reaction chamber of said series, whereby a new series of reaction chambers is constructed. Then, the starting materials are fed from the inlet of the terminal reaction chamber of the newly constructed series towards the other terminal, maintaining the same direction of the current of gases as in the previous series. The procedures of withdrawing the terminal reaction chamber housing older catalyst from said series of reaction chamber and connecting a newly prepared or regenerated reaction chamber to the other side of the series is repeated at intervals, and when all chambers are thus processed, the catalyst activity profile reaches a state of equilibrium to yield stabilized results.

For the purpose of better yield and high purity of the reaction product it is recommended to perform the condensation reaction in said stationary state of the reaction system.

The suitable catalysts employable in the method of the present invention are exemplified by acid surface-active clay catalysts (e.g., montmorillonite, acid clay, kaolin, etc.), petroleum-cracking catalysts (e.g. silica-alumina, silica-magnesia, silicazirconia, etc.), silica gel containing phosphoric acid, activated alumina, the iso-or heteropolyacids of heavy metals (e.g. of molybdenum, tungsten, vanadium, etc.), such as phosphotungstic acid, borotungstic acid, etc., metal phosphates (e.g. the phosphates of the elements belonging to Group III B or Group II A of Periodic Table of the Elements or of cadmium, iron, etc.), chromium oxide-phosphoric acid, manganese oxide-phosphoric acid, silver oxide and the like may be employed to advantage. Among the aforementioned catalysts, catalysts other than acid surface-active clay and petroleum-cracking catalysts are generally used as supported on suitable supports. The supports may for example be alumina, silica, diatomaceus earth, activated clay and the like.

Those catalysts for example are prepared by conventional means as follows, in which "parts" is intended to mean "parts by weight."

Catalyst preparation 1.

An aqueous solution containing 17.6 parts calcium acetate is added to 100 parts silica gel, which is then heated on a water bath to dryness. The gel thus treated is washed with aqueous ammonia and, then, 100 parts of an aqueous solution containing 11.5 parts 80% phosphoric acid is added.

The water is evaporated a second time to leave the silica gel dry. The gel is then calcined at 350°–500° C. to obtain a calcium phosphate catalyst.

Catalyst preparation 2.

To 100 parts silica gel is added 150 parts of a mixed aqueous solution containing 7.6 parts ammonium chromate and 9.2 parts 85% phosphoric acid. The mixture is heated on a water bath to evaporate the water.

The gel is then calcined at 350°–500° C. to obtain a chromium oxide-phosphoric acid catalyst.

Following comparative experiments show that an apparatus comprises at least two reaction chambers gives exceedingly better results as compared with one reaction chamber (i.e. the conventional fixed-bed catalyst). It should be also noted that the increase of the number of reaction chambers remarkably decrease the amounts of byproducts till the number reaches to five, and for the practical purpose an integer from 2 to 10 is selected as the number of reaction chambers.

Comparative experiment 1.

A plurality of reaction chambers (the number of reaction chambers are represented by N) are connected in series, each reaction chamber equipped with 100/N gram of the catalyst prepared by the method described in the above described catalyst preparation 1. 20 gram of formaldehyde, 50 gram of aqueous vapor and 200 gram of isobutene are supplied per hour and are allowed to pass N reaction chamber(s). After the first 5/N hour, the reaction chamber at the outlet of the gas containing isoprene is disconnected and a fresh reaction chamber of the catalyst is connected to the other terminal reaction chamber. The gases to be reacted are supplied at the inlet of the newly connected reaction chamber and the gas containing the product isoprene flowing out of the outlet of the reaction chamber adjacent to the withdrawn reaction chamber is collected to isolate the product isoprene.

After 5 hours, the catalyst activity profile reaches a state of equilibrium to yield stabilized results. The same procedures as above are repeated to obtain the following results.

| Number of reaction chamber(s) | Reaction rate of formaldehyde [1] | Selectivity of reacted formaldehyde to isoprene [2] | Yield of isoprene [3] | Amount of methyl butene in the product isoprene [1] | Polymerized oil [4] |
|---|---|---|---|---|---|
| 1 | 76 | 53 | 40.3 | 2.4 | 4.0 |
| 2 | 78 | 60 | 46.8 | 1.6 | 0.8 |
| 3 | 80 | 61 | 48.8 | 1.0 | 0.2 |
| 5 | 80 | 63 | 50.4 | 0.5 | 0.1 |
| 10 | 78 | 64 | 49.9 | 0.4 | 0.1 |

[1] Percent in weight basis.
[2] Percent in molar basis.
[3] Percent in molar of fed formaldehyde basis.
[4] Parts by weight.

It should be noted that the data in which the number of the reaction chamber is 1 indicates the result of the hitherto known fixed-bed reaction. From the above results, it is apparent that the method of the present invention surpasses the known method.

Comparative experiment 2.

The gases to be reacted are passed through the reaction chambers in an opposite direction with regard to the direction in comparative experiment 1. That is to say, the reaction chamber at the inlet of the raw material is withdrawn and a fresh or regenerated reaction chamber is supplied at the outlet of the gas containing the product isoprene, and other reaction conditions are the same as in comparative experiment 1. Thus obtained results are shown as follows.

| Number of reaction chamber(s) | Reaction rate of formaldehyde [1] | Selectivity of reacted formaldehyde to isoprene [2] | Yield of isoprene [3] | Amount of methyl butene in the product isoprene [1] | Polymerized oil [4] |
|---|---|---|---|---|---|
| 1 | 76 | 53 | 40.2 | 2.4 | 4.0 |
| 2 | 79 | 58 | 45.8 | 2.0 | 1.1 |
| 3 | 75 | 60 | 45.0 | 1.3 | 0.4 |
| 5 | 76 | 62 | 47.1 | 0.7 | 0.3 |
| 10 | 75 | 62 | 46.5 | 0.6 | 0.3 |

[1] Percent in weight basis.
[2] Percent in molar basis.
[3] Percent in molar of fed formaldehyde basis.
[4] Parts by weight.

These data also show the superiority of the method of the present invention to the hitherto known method.

From the results of the above two experiments, it is apparent that the starting materials may be passed in as parallel currents or countercurrents with respect to the sequence of the reaction chambers.

The withdrawn reaction chamber is regenerated by a per se known procedure, for example, by heating said chamber at a temperature ranging from about 200° C. to about 500° C. in the current of air, nitrogen, aqueous vapor or the like, and is employed as a fresh reaction chamber.

The optimum interval of withdrawing oldest reaction chamber is selected with reference to the life cycle period of the conventional fixed-bed catalyst and the interval is generally a value represented by [life cycle period of the catalyst]/ [the number of reaction chambers]. However, the interval should preferably be constant in order to keep the reaction rate and the selectivity from fluctuating. The proportions and the flow rate of the starting materials may be adjusted as freely as in the conventional fixed-bed reaction, and even the reaction temperature and pressure may be selected within the range suited for the conventional fixed-bed reaction. Generally speaking, however, the molar ratio of isobutene to formaldehyde should be in excess of 1 and, preferably, equal to 3 or more. The flow rate of the materials per litre of the total catalyst is 5 to 500 moles per hour, in terms of total feed, while the reaction temperature is desirably in the range from about 200° to about 350° C. The reaction pressure may be any of reduced, atmospheric and elevated pressures, but from economic points of view, atmospheric to elevated pressure is preferred. It is also to be understood that the reaction may be conducted in the presence of substances which are inert to the reaction, such as nitrogen, water or methanol.

Isoprene is recovered from the gas flowing out of the outlet of terminal reaction chamber by per se known procedures, for example, cooling the gas and fractionating. Of course unreacted formaldehyde or isobutene is again employable as the raw materials.

Those operations minimize the loss of product isoprene due to the high activity of the catalyst in the initial phase of the reaction, thereby enhancing both the yield and purity of the desired product isoprene.

The most troublesome byproducts of the condensation between formaldehyde and isobutene are methylbutene and polymerized oils. The former is difficult to be excluded from the isoprene and the latter harms the catalyst as well as the reaction apparatus. The method of the present invention dramatically depresses the amounts of these byproducts.

To effect the method of the present invention, it is recommended to use an apparatus, comprising a plurality of reaction chambers, and said reaction chambers being connected with gas-conductible ducts each equipped with a valve or valves, each of said reaction chambers having one or more inlets to feed gases to be reacted and one or more outlets to flow out the resulting gas containing the product isoprene.

Following explanation according to the attached drawing will serve to illustrate an embodiment of the method of the present invention. Five reaction chambers, each housing a portion of a catalyst which has taken part in the reaction for different period of time from one another, in a series as arranged in a sequence corresponding to the reaction time gradient with gas-conductible ducts equipped with valves represented in the drawing. The reaction chamber 1 of the four reaction chambers 1, 2, 3 and 4 is the oldest, and the reaction chamber 5 is new or a regenerated one.

The valve 1A is opened, while valves 6,7,8 and 4B are also opened. The gases to be reacted is conducted into valve 1A and gases are passed through reaction chambers 1, 2, 3 and 4 in this order. The reaction product- containing gas flowing out of the valve 4B is collected and isoprene is recovered by a known means. After predetermined time of reaction, valves 1A, 4B and 6 are closed and at the same time valves 2A, 5B and 9 are opened. The raw materials are supplied from the valve 2A, while the catalyst in the reaction chamber 1 is regenerated by passing air from the valve 1A to the valve 1B under heating. Again after the same reaction time as above, the reaction is carried out by the use of the reaction chambers 3, 4, 5 and 1, while the catalyst of the reaction chamber 2 is regenerated. These procedures are repeated to obtain reaction product of invariable component, and the continuous production is performed without suspending the reaction.

In the above apparatus, if desired, the gases may be passed inversely, in this case, the inlet to feed gases to be reacted and the outlet to flow out the resulting gas containing the product are reversed.

EXAMPLE 1

Five reaction chambers are respectively filled with 20 parts by weight of the catalyst according to catalyst preparation 2 and, then, connected in series.

15 parts by weight of formaldehyde, 25 parts by weight of aqueous vapor and 200 parts by weight of isobutene are supplied per hour and are allowed to pass the five reaction chambers at 300° C. The reaction product is cooled and trapped. Isoprene is recovered from the trapped reaction product. After the first hour of the reaction, the reaction chamber at the feeding end is disconnected and a new reaction chamber filled with a fresh supply of the catalyst is connected to the other terminal reaction chamber. The gases to be reacted is supplied at the inlet of the reaction chamber adjacent to the withdrawn chamber, while the isoprene-containing gas passed through all reaction chambers is collected from the out let of the newly supplied reaction chamber.

The above operation is repeated at an interval of an hour and the removed catalyst is regenerated and used again. In a total of 5 hours of reaction, the catalyst activity profile reaches a state of equilibrium to yield stabilized results. In this state the same procedures are repeated and the following data are obtained. The reaction rate of formaldehyde, isoprene selectivity and the methylbutene content of product isoprene are 88 percent, 65 percent and 0.4 percent, respectively. As a control run, using 100 parts by weight of the same catalyst as above, the conventional fixed-bed reaction is carried out under the same conditions. The run yields the following average values for 5 hours of reaction.

The reaction rate of formaldehyde 84 percent; isoprene selectivity 57 percent; the methylbutene content of product isoprene 0.9 percent.

EXAMPLE 2

Four reaction chambers, each equipped with an inlet and an outlet of gases, are respectively filled with 33 parts by weight of the catalyst according to the above mentioned catalyst preparation 1 and, then, connected in series.

From a terminal inlet of the series of reaction chambers, 15 parts by weight of formaldehyde, 25 parts by weight of aqueous vapor and 200 parts by weight of isobutene are supplied per hour, and allowed to pass three reaction chambers at 300° C. The reaction product is cooled and trapped to isolate isoprene.

After 2 hours of reaction time, the remaining reaction chamber is connected to the terminal end of the reaction chambers series, while the other terminal reaction chamber is withdrawn, and the raw materials are supplied from the inlet of the newly connected reaction chamber, while the gas containing the product isoprene flowing out of the reaction chamber adjacent to the withdrawn reaction chamber is collected to isolate the product isoprene. At an interval of 2 hours, the above procedures are repeated, and the withdrawn reaction chamber is regenerated and used as a fresh reaction chamber.

In a total of 6 hours of reaction, the catalyst activity profile reaches a state of equilibrium to yield stabilized results.

In this state, the same procedures are repeated and the following data are obtained. The reaction rate of formaldehyde, isoprene selectivity and methylbutene content of product isoprene are 90 percent, 63 percent and 0.3 percent respectively.

As a control run, using 100 parts by weight of the same catalyst as above, the conventional fixed-bed reaction is carried out under the same conditions. The run yields the following average values for 6 hours of reaction. The reaction rate of formaldehyde 88 percent; the selectivity to isoprene 53 percent; and the methylbutene content of product isoprene 1.0 percent.

What is claimed is:

1. In a method for the production of isoprene through condensation between formaldehyde and isobutene in a gas phase in the presence of a fixed-bed catalyst, an improvement which comprises conducting formaldehyde and isobutene into a terminal reaction chamber of an apparatus comprising serially connected reaction chambers, each housing a portion of a catalyst which has taken part in the reaction for a longer or shorter period of time than the preceding one; recovering the so-produced isoprene from the gas flowing out of the opposite terminal reaction chamber; while periodically withdrawing a terminal reaction chamber housing oldest catalyst from said series of reaction chambers, and connecting a reaction chamber housing a fresh catalyst to the opposite terminal reaction chamber in said series.

2. A method according to claim 1, wherein the isoprene product is recovered from the terminal reaction chamber housing the oldest catalyst.

3. A method according to claim 1, wherein the isoprene product is recovered from the terminal reaction chamber housing the freshest catalyst.

4. An improvement as claimed in claim 1, wherein the series of the reaction chambers is constructed with from two to 10 chambers.